(12) United States Patent
Adolfsson et al.

(10) Patent No.: US 12,441,292 B2
(45) Date of Patent: Oct. 14, 2025

(54) METHOD OF CONTROLLING OPERATION OF A VEHICLE, COMPUTER PROGRAM, COMPUTER-READABLE MEDIUM, CONTROL ARRANGEMENT, AND VEHICLE

(71) Applicant: Scania CV AB, Södertälje (SE)

(72) Inventors: Jonathan Adolfsson, Bandhagen (SE);
Anders Kjell, Ekerö (SE); Christian Wessel, Rönninge (SE); David Elfvik, Älvsjö (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/637,777

(22) Filed: Apr. 17, 2024

(65) Prior Publication Data
US 2024/0351569 A1    Oct. 24, 2024

(30) Foreign Application Priority Data
Apr. 24, 2023  (SE) ..................... 2350485-5

(51) Int. Cl.
*B60W 10/14*   (2012.01)
*B60W 10/184*  (2012.01)
*B60W 40/068*  (2012.01)

(52) U.S. Cl.
CPC .......... *B60W 10/14* (2013.01); *B60W 10/184* (2013.01); *B60W 40/068* (2013.01); *B60W 2300/125* (2013.01); *B60W 2520/10* (2013.01); *B60W 2520/263* (2013.01); *B60W 2520/30* (2013.01); *B60W 2552/40* (2020.02)

(58) Field of Classification Search
CPC .. B60W 10/14; B60W 10/184; B60W 40/068; B60W 2300/125; B60W 2520/10; B60W 2520/263; B60W 2520/30; B60W 2552/40; B60W 30/18172; B60W 30/188; B60W 2720/403; B60L 3/106; B60L 15/20; B60L 2240/423; B60K 28/16; B60K 23/0808
See application file for complete search history.

(56) References Cited

U.S. PATENT DOCUMENTS

| | | | |
|---|---|---|---|
| 6,470,250 B2 * | 10/2002 | Nishizaki | B60T 8/246 701/1 |
| 7,739,005 B1 | 6/2010 | Tang | |
| 2009/0255746 A1 | 10/2009 | Boesch | |
| 2015/0038286 A1 | 2/2015 | Hane | |
| 2015/0203117 A1 * | 7/2015 | Kelly | B60W 40/06 701/91 |
| 2016/0121883 A1 | 5/2016 | Mao et al. | |

(Continued)

OTHER PUBLICATIONS

Scania CV AB, Swedish Patent Application No. 2350485-5, Office Action, Nov. 30, 2023.

*Primary Examiner* — Tisha D Lewis
(74) *Attorney, Agent, or Firm* — Moore & Van Allen PLLC; W. Kevin Ransom (57) ABSTRACT

A method is provided for controlling operation of a vehicle having at least one leading wheel axle and at least one trailing wheel axle. The method monitors a wheel slip of the wheels arranged at the at least one leading wheel axle and controls a wheel torque of the wheels arranged at the at least one trailing wheel axle based on: (i) the monitored wheel slip, (ii) a speed of the vehicle relative to the surface, and the distance between the at least one leading wheel axle and the at least one trailing wheel axle.

19 Claims, 4 Drawing Sheets

(56) References Cited

U.S. PATENT DOCUMENTS

| | | |
|---|---|---|
| 2017/0057515 A1 | 3/2017 | Kelly et al. |
| 2017/0158201 A1* | 6/2017 | Fairgrieve ............. B60W 10/06 |
| 2017/0166212 A1 | 6/2017 | Flaum et al. |
| 2018/0162349 A1 | 6/2018 | Chang et al. |
| 2018/0244257 A1 | 8/2018 | Kneitz et al. |
| 2024/0278786 A1* | 8/2024 | Chaudet .............. B60W 30/188 |

* cited by examiner

METHOD OF CONTROLLING OPERATION OF A VEHICLE, COMPUTER PROGRAM, COMPUTER-READABLE MEDIUM, CONTROL ARRANGEMENT, AND VEHICLE

CROSS-REFERENCE TO RELATED APPLICATIONS

This application claims priority to Swedish Patent Application No. 2350485-5 filed on Apr. 24, 2023, of the same title; the contents of which are hereby incorporated by reference.

TECHNICAL FIELD

The present disclosure relates to a method of controlling operation of a vehicle, wherein the vehicle comprises two or more wheel axles and a number of wheels arranged at each of the two or more wheel axles. The present disclosure further relates to a computer program, a computer-readable medium, a control arrangement, and a vehicle.

BACKGROUND

Wheeled vehicles such as passenger cars, trucks, busses, and the like, normally comprise two or more wheel axles and a number of wheels arranged at each of the two or more wheel axles. Moreover, vehicles commonly comprise wheel brakes controllable to brake the wheels arranged at each of the two or more wheel axles of the vehicle. The wheel brakes may comprise drum brakes, disc brakes, or the like.

Powertrains are used in vehicles for providing motive power to the vehicle via a number of wheels of the vehicle. A powertrain comprises a power source and a drive train. The power source may for example comprise an internal combustion engine, an electric machine, or the like. The drivetrain can be said to comprise all components that transfer power between the power source and wheels of the vehicle, such as a vehicle transmission, driveshafts, differentials, axles, and the like.

Traditionally, vehicles have been equipped with one powertrain configured to provide motive power to the vehicle via wheels arranged at one or more wheel axles of the vehicle. Wheels that are, or at least can be, operably connected to a power source of the vehicle are normally referred to as driven wheels, whereas wheels that are not, nor can be, operably connected to the power source of the vehicle are normally referred to as non-driven wheels.

Most modern vehicles comprise a traction control system and an anti-lock braking system. A traction control system is normally abbreviated TCS and an anti-lock braking system is normally abbreviated ABS. Each of these systems normally operate using input from wheel speed sensors arranged to monitor the rotational speed of wheels of the vehicle. A traction control system normally operates by applying a brake force to one or more driven wheels, and/or by reducing the power output of a power source of the vehicle, if it is detected that the one or more driven wheels spins significantly faster than a threshold set from a speed estimate of the vehicle. The speed estimate of the vehicle may for example be obtained using input from a number of wheel sensors configured to sense the rotational speed of a number of non-driven wheels. An anti-lock braking system operates by reducing the braking force on a wheel if it is detected that the wheel is rotating significantly slower than a threshold set from a speed estimate of the vehicle. Like above, the speed estimate of the vehicle may for example be obtained using input from a number of wheel sensor configured to sense the rotational speed of one or more other wheels of the vehicle.

As understood from the above, each of these traditional systems operate in a reactive manner meaning that the control measures are performed in response to a detection of a rotational speed difference between wheels of the vehicle. In other words, a significant wheel slip must occur before the system can intervene and perform appropriate control actions to reduce the wheel slip.

A problem is that significant wheel slip significantly reduces the wheel grip, i.e., the force transferring ability between the wheel and the road surface. In most conditions, the force transferring ability between the wheel and the road surface is greatest just before a wheel is starting to slip, and the systems referred to above are limited by this fact, because a wheel needs to slip significantly before appropriate control actions can be performed.

Moreover, significant wheel slip impairs the operational safety of the vehicle because of the reduced force transferring ability between the wheel and a road surface in the longitudinal direction of the vehicle as well as in lateral directions of the vehicle.

Furthermore, significant wheel slip may cause excessive wear and tear of the wheels as well as of the surface on which the vehicle currently is positioned. In addition, significant wheel slip can increase the energy consumption of a vehicle because less energy is transferred to the road. Moreover, significant wheel slip can generate noise which can disturb humans and animals in the vicinity of the vehicle.

SUMMARY

It is an object of the present invention to overcome, or at least alleviate, at least some of the above-mentioned problems and drawbacks.

According to a first aspect of the invention, the object is achieved by a method of controlling operation of a vehicle, wherein the method is performed by a control arrangement, and wherein the vehicle comprises two or more wheel axles and a number of wheels arranged at each of the two or more wheel axles. The method comprises the steps of, when the vehicle is moving in a movement direction relative to a surface supporting the vehicle such that at least one of the two or more wheel axles constitutes a leading wheel axle and at least one of the two or more wheel axles constitutes a trailing wheel axle as seen relative to the movement direction:

monitoring a wheel slip of the wheels arranged at the at least one leading wheel axle, and controlling a wheel torque of the wheels arranged at the at least one trailing wheel axle based on the monitored wheel slip, a speed of the vehicle relative to the surface, and the distance/distances between the at least one leading wheel axle and the at least one trailing wheel axle.

Thereby, a method is provided capable of controlling the wheel torque of the wheels arranged at the at least one trailing wheel axle in a proactive and predictive manner instead of in a reactive manner to thereby be able to reduce occurrences of significant wheel slip of the wheels arranged at the at least one trailing wheel axle.

This is because the method comprises the step of controlling a wheel torque of the wheels arranged at the at least one trailing wheel axle based on the monitored wheel slip of the wheels arranged at the at least one leading wheel axle, a speed of the vehicle relative to the surface, and the distance/distances between the at least one leading wheel axle and the at least one trailing wheel axle. In other words, due to the features of the method, the wheel torque of the wheels arranged at the at least one trailing wheel axle can be controlled in a more exact and accurate manner to avoid significant wheel slip of the wheels arranged at the at least one trailing wheel axle.

Since occurrences of significant wheel slip of the wheels arranged at the at least one trailing wheel axle can be reduced, the operational safety of the vehicle can be improved. Moreover, excessive wear and tear of the wheels arranged at the at least one trailing wheel axle can be reduced as well as of the surface supporting the vehicle. Furthermore, the method provides conditions for an improved energy efficiency of the vehicle because more energy can be transferred to the road via the wheels arranged at the at least one trailing wheel axle. In addition, a method is provided having conditions for lowering the noise generated by the vehicle during operation thereof.

Accordingly, a method is provided overcoming, or at least alleviating, at least some of the above-mentioned problems and drawbacks. As a result, the above-mentioned object is achieved.

Optionally, the step of controlling the wheel torque of the wheels arranged at the at least one trailing wheel axle comprises:

controlling the wheel torque of the wheels arranged at the at least one trailing wheel axle using a time delay from the monitored wheel slip of the wheels arranged at the at least one leading wheel axle, wherein a duration of the time delay is set based on the ratio between the distance/distances between the at least one leading wheel axle and the at least one trailing wheel axle and the speed of the vehicle relative to the surface.

Since the duration of the time delay is set based on the ratio between the distance/distances between the at least one leading wheel axle and the at least one trailing wheel axle and the speed of the vehicle relative to the surface, a method is provided having conditions for controlling the wheel torque of the wheels arranged at the at least one trailing wheel axle in a further improved proactive and predictive manner so as to avoid significant wheel slip of the wheels arranged at the at least one trailing wheel axle.

That is, as an example, if the vehicle is currently moving over a surface comprising a section having different friction properties than the remaining surface, such as an ice patch, a puddle of water, or a sandy or gravelly surface, on an otherwise continuous tarmac surface, the monitoring of the wheel slip of the wheels arranged at the at least one leading wheel axle may indicate that the wheels arranged at the at least one leading wheel axle are located at the section having different friction properties.

The ratio between the distance/distances between the at least one leading wheel axle and the at least one trailing wheel axle and the speed of the vehicle relative to the surface indicates when the wheels arranged at the at least one trailing wheel axle will reach the section having the different friction properties. Accordingly, by controlling the wheel torque of the wheels arranged at the at least one trailing wheel axle using the time delay, the wheel torque of the wheels arranged at the at least one trailing wheel axle can be adjusted at an end of the time delay to avoid excessive wheel slip in a proactive and predictive manner when the wheels arranged at the at least one trailing wheel axle reaches the section of the surface having the different friction properties.

The above given example also applies if the conditions are opposite, i.e., if the vehicle is currently moving over a slippery surface, such as an icy road, a sandy or gravelly surface, or the like, wherein the slippery surface comprises a section with greater friction properties, such as an exposed portion of tarmac. The monitoring wheel slip of the wheels arranged at the at least one leading wheel axle may in such situations indicate that the wheels arranged at the at least one leading wheel axle are located at the section having higher friction properties. Accordingly, by controlling the wheel torque of the wheels arranged at the at least one trailing wheel axle using the time delay from the monitored wheel slip of the wheels arranged at the at least one leading wheel axle, the wheel torque of the wheels arranged at the at least one trailing wheel axle can be adjusted at an end of the time delay to thereby provide an increased propulsion force or braking force to the vehicle in a proactive and predictive manner when the wheels arranged at the at least one trailing wheel axle reaches the section of the surface with greater friction properties.

As is further explained herein, and as is understood from the above, the step of controlling the wheel torque of the wheels arranged at the at least one trailing wheel axle may be performed by controlling operation of one or more wheel brakes and/or one or powertrains of the vehicle.

Optionally, the step of monitoring the wheel slip comprises:

detecting a change in the wheel slip of the wheels arranged at the at least one leading wheel axle, and wherein the step of controlling the wheel torque of the wheels arranged at the at least one trailing wheel axle comprises:

adjusting the wheel torque of the wheels arranged at the at least one trailing wheel axle based on a magnitude of the detected change in the wheel slip of the wheels arranged at the at least one leading wheel axle.

Thereby, method is provided having conditions for controlling the wheel torque of the wheels arranged at the at least one trailing wheel axle in a further improved proactive and predictive manner.

Optionally, the method comprises the step of:

adjusting the wheel torque of the wheels arranged at one or more other wheel axles of the two or more wheel axles with a combined magnitude set to compensate for the adjustment of the wheel torque of the wheels arranged at the at least one trailing wheel axle.

Thereby, a method is provided capable of avoiding wheel slip of the wheels arranged at the at least one trailing wheel axle while not significantly affecting current desired acceleration or deceleration of the vehicle. In this manner, conditions are provided for a smooth, predictive, and controlled of operation of the vehicle.

Optionally, the method comprises the step of:

providing a friction coefficient estimate between the surface and the wheels arranged at the at least one leading wheel axle based on the monitored wheel slip, and wherein the step of controlling the wheel torque of the wheels arranged at the at least one trailing wheel axle comprises:

adjusting the wheel torque of the wheels arranged at the at least one trailing wheel axle based on the provided friction coefficient estimate.

Thereby, method is provided having conditions for controlling the wheel torque of the wheels arranged at the at least one trailing wheel axle in a further improved proactive and predictive manner so as to avoid significant wheel slip of the wheels arranged at the at least one trailing wheel axle.

Optionally, the vehicle comprises a powertrain configured to provide motive power to the vehicle via the wheels arranged at the at least one trailing wheel axle, and wherein the step of controlling the wheel torque of the wheels arranged at the at least one trailing wheel axle comprises:

controlling operation of the powertrain of the at least one trailing wheel axle.

Thereby, a method is provided capable of obtaining a propulsion force or a repulsion force on the vehicle in a proactive and predictive manner without risking excessive wheel slip by controlling operation of the powertrain of the at least one trailing wheel axle. The control of operation of the powertrain may comprise a control of a power output of a power source of the powertrain.

Optionally, the vehicle comprises a powertrain configured to provide motive power to the vehicle via the wheels arranged at the at least one leading wheel axle, and wherein the step of monitoring the wheel slip is performed during torque transfer between the powertrain of the at least one leading wheel axle and the wheels arranged at the at least one leading wheel axle. Thereby, a method is provided in which the wheel slip of the wheels arranged at the at least one leading wheel axle can be monitored in an efficient and reliable manner.

Optionally, the vehicle comprises wheel brakes controllable to brake the wheels arranged at each of the two or more wheel axles of the vehicle, and wherein the step of controlling the wheel torque of the wheels arranged at the at least one trailing wheel axle comprises:

controlling operation of the wheel brakes of the at least one trailing wheel axle.

Thereby, a method is provided capable of controlling the wheel torque of the wheels arranged at the at least one trailing wheel axle in an efficient and reliable manner to avoid excessive wheel slip. The step of controlling operation of the wheel brakes of the at least one trailing wheel axle may comprise the control of at least one wheel brake of the at least one trailing wheel axle. The control of operation of a wheel brake, as referred to herein, may comprise a control of a magnitude of a braking force provided by the wheel brake. Moreover, the control of operation of a wheel brake may comprise a control of a hydraulic or pneumatic pressure supplied to the wheel brake.

Optionally, the vehicle comprises wheel brakes controllable to brake the wheels arranged at each of the two or more wheel axles of the vehicle, and wherein the step of monitoring the wheel slip is performed during torque transfer between the wheel brakes of the at least one leading wheel axle and the wheels arranged at the at least one leading wheel axle. Thereby, a method is provided in which the wheel slip of the wheels arranged at the at least one leading wheel axle can be monitored in an efficient and reliable manner.

According to a second aspect of the invention, the object is achieved by a computer program comprising instructions which, when the program is executed by a computer, cause the computer to carry out the method according to some embodiments of the present disclosure. Since the computer program comprises instructions which, when the program is executed by a computer, cause the computer to carry out the method according to some embodiments described herein, a computer program is provided which provides conditions for overcoming, or at least alleviating, at least some of the above-mentioned drawbacks. As a result, the above-mentioned object is achieved.

According to a third aspect of the invention, the object is achieved by a computer-readable medium comprising instructions which, when executed by a computer, cause the computer to carry out the method according to some embodiments of the present disclosure. Since the computer-readable medium comprises instructions which, when the program is executed by a computer, cause the computer to carry out the method according to some embodiments described herein, a computer-readable medium is provided which provides conditions for overcoming, or at least alleviating, at least some of the above-mentioned drawbacks. As a result, the above-mentioned object is achieved.

According to a fourth aspect of the invention, the object is achieved by a control arrangement configured to control operation of a vehicle, wherein the vehicle comprises two or more wheel axles and a number of wheels arranged at each of the two or more wheel axles, and wherein the control arrangement is configured to, when the vehicle is moving in a movement direction relative to a surface supporting the vehicle such that at least one of the two or more wheel axles constitutes a leading wheel axle and at least one of the two or more wheel axles constitutes a trailing wheel axle as seen relative to the movement direction:

monitor a wheel slip of the wheels arranged at the at least one leading wheel axle, and control a wheel torque of the wheels arranged at the at least one trailing wheel axle based on the monitored wheel slip, a speed of the vehicle relative to the surface, and the distance/distances between the at least one leading wheel axle and the at least one trailing wheel axle.

Thereby, a control arrangement is provided capable of controlling the wheel torque of the wheels arranged at the at least one trailing wheel axle in a proactive and predictive manner instead of in a reactive manner to thereby be able to reduce occurrences of significant wheel slip of the wheels arranged at the at least one trailing wheel axle.

This is because the control arrangement is configured to control the wheel torque of the wheels arranged at the at least one trailing wheel axle based on the monitored wheel slip of the wheels arranged at the at least one leading wheel axle, a speed of the vehicle relative to the surface, and the distance/distances between the at least one leading wheel axle and the at least one trailing wheel axle. In other words, due to the features of the control arrangement, the wheel torque of the wheels arranged at the at least one trailing wheel axle can be controlled in a more exact and accurate manner to avoid significant wheel slip of the wheels arranged at the at least one trailing wheel axle.

Since occurrences of significant wheel slip of the wheels arranged at the at least one trailing wheel axle can be reduced, the operational safety of the vehicle can be improved. Moreover, excessive wear and tear of the wheels arranged at the at least one trailing wheel axle can be reduced as well as of the surface supporting the vehicle. Furthermore, the control arrangement provides conditions for an improved energy efficiency of the vehicle because more energy can be transferred to the road via the wheels arranged at the at least one trailing wheel axle. In addition, a control arrangement is provided having conditions for lowering the noise generated by the vehicle during operation thereof.

Accordingly, a control arrangement is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement according to the fourth aspect of the invention may be configured to perform any one of the method steps of the method according to the first aspect of the invention.

According to a fifth aspect of the invention, the object is achieved by a vehicle comprising two or more wheel axles and a number of wheels arranged at each of the two or more wheel axles, and wherein the vehicle comprises a control arrangement according to some embodiments of the present disclosure. Since the vehicle comprises a control arrangement according to some embodiments, a vehicle is provided overcoming, or at least alleviating, at least some of the above-mentioned problems and drawbacks. As a result, the above-mentioned object is achieved.

Optionally, the vehicle comprises two or more powertrains each comprising a power source configured to provide motive power to the vehicle via the wheels arranged at a respective wheel axle of the two or more wheel axles, and wherein the control arrangement is configured to control the wheel torque of the wheels arranged at the at least one trailing wheel axle by controlling operation of the powertrain of the at least one trailing wheel axle. Thereby, a vehicle is provided capable of obtaining a propulsion force or a repulsion force in a proactive and predictive manner without risking excessive wheel slip of the wheels arranged at the at least one trailing wheel axle. The operation of the powertrain of the at least one trailing wheel axle may be controlled by controlling the power output of the power source of the powertrain.

Optionally, each of the two or more powertrains is separate from, and independent of, the other of the two or more powertrains. Thereby, conditions are provided for an improved individual control of the wheel torque of the wheels of the wheel axles of the vehicle.

Optionally, the power source of at least one of the two or more powertrains is an electric machine. Thereby, conditions are provided for a more environmentally friendly vehicle.

Moreover, conditions are provided for an accurate control of the wheel torque of the wheels of the vehicle.

Optionally, the vehicle is a heavy road vehicle, such as a truck or a bus. Thereby, a heavy road vehicle is provided having at least some of the above-mentioned advantages.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like reference signs refer to like elements throughout. Well-known functions or constructions will not necessarily be described in detail for brevity and/or clarity.

Figure 1:
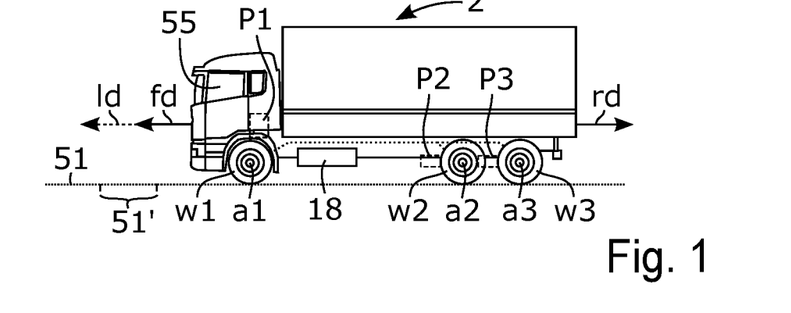
FIG. 1 schematically illustrates a vehicle according to some embodiments.

FIG. 1 schematically illustrates a vehicle 2 according to some embodiments. According to the illustrated embodiments, the vehicle 2 is a truck, i.e., a type of heavy road vehicle as well as a type of heavy commercial vehicle. According to further embodiments, the vehicle 2, as referred to herein, may be another type of heavy or lighter type of manned or unmanned vehicle for land-based propulsion such as a lorry, a bus, a construction vehicle, a tractor, a car, or the like.

In FIG. 1, the vehicle 2 is illustrated as comprising three wheel axles a1, a2, a3. In some places below, the wheel axles a1, a2, a3 of the vehicle 2 are referred to as a first wheel axle a1, a second wheel axle a2, and a third wheel axle a3. According to further embodiments, the vehicle 2 may comprise another number of wheel axles a1, a2, a3, such as two wheel axles only or more than three wheel axles. As is further explained herein, each wheel axle a1, a2, a3 of the vehicle 2 comprises a number of wheels w1, w2, w3 arranged at the wheel axle a1, a2, a3. That is, each of the wheel axle a1, a2, a3 of the vehicle 2 supports a number of wheels w1, w2, w3 relative to a chassis of the vehicle 2. In FIG. 1, the chassis of the vehicle 2 has not been provided with a reference sign for reasons of brevity and clarity. The number of wheels w1, w2, w3 of the vehicle 2 may also be referred to as a number of ground engaging wheels w1, w2, w3 of the vehicle 2.

According to the illustrated embodiments, the vehicle 2 comprises two wheels w1 arranged at the first wheel axle a1 and four wheels w2, w3 arranged at each of the second wheel axle a2 and the third wheel axle a3. However, according to further embodiments, the vehicle 2 may comprise another number of wheels w1, w2, w3 arranged at the wheel axles a1, a2, a3 thereof, such as two or more wheels w1, w2, w3 arranged at each wheel axle a1, a2, a3 of the vehicle 2.

According to the illustrated embodiments, the first wheel axle a1 constitutes a front wheel axle and the wheels w1 thereof thus constitute front wheels of the vehicle 2. Moreover, according to the illustrated embodiments, each of the second and third wheel axle a2, a3 can be said to constitute a rear wheel axle and the wheels w2, w3 thereof can be said to constitute rear wheels of the vehicle 2. According to the embodiments illustrated in FIG. 1, the second and third wheel axles a2, a3 are arranged relatively close to each other and can be said to together form a tandem axle of the vehicle 2.

Moreover, according to the illustrated embodiments, the wheels w1 of the first wheel axle a1 are steered driven wheels whereas the wheels w2, w3 of the second and third wheel axle a2, a3 are non-steered driven wheels. The feature that the wheels w1 of the first wheel axle a1 are steered wheels means that the vehicle 2 comprises a steering system controllable to change a rolling direction of the number of wheels w1 relative to the chassis of the vehicle 2. However, according to further embodiments, the vehicle 2 may comprise another configuration of wheels w1, w2, w3 and wheel axles a1, a2, a3 than depicted in FIG. 1.

In FIG. 1, the vehicle 2 is illustrated as positioned in an intended use position on a surface 51 supporting the vehicle 2. As seen in FIG. 1, the number of wheels w1, w2, w3 of the vehicle 2 is configured to abut against the surface 51 when the vehicle 2 is positioned in the intended use position thereon. Moreover, in FIG. 1, a forward moving direction fd and a reverse moving direction rd are indicated. The reverse moving direction rd of the vehicle 2 is opposite to the forward moving direction fd of the vehicle 2. Furthermore, in FIG. 1, a longitudinal direction ld of the vehicle 2 is indicated. The longitudinal direction ld of the vehicle 2 is parallel to each of the forward moving direction fd and the reverse moving direction rd of the vehicle 2.

According to the embodiments illustrated in FIG. 1, the vehicle 2 comprises three powertrains P1, P2, P3. In some places below, these are referred to as a first powertrain P1, a second powertrain P2, and a third powertrain P3. According to the illustrated embodiments, the first powertrain P1 is controllable to provide motive power to the vehicle 2 via the wheels w1 arranged at the first wheel axle a1, the second powertrain P2 is controllable to provide motive power to the vehicle 2 via the wheels w2 arranged at the second wheel axle a2, and the third powertrain P1 is controllable to provide motive power to the vehicle 2 via the wheels w3 arranged at the third wheel axle a3.

Figure 2:
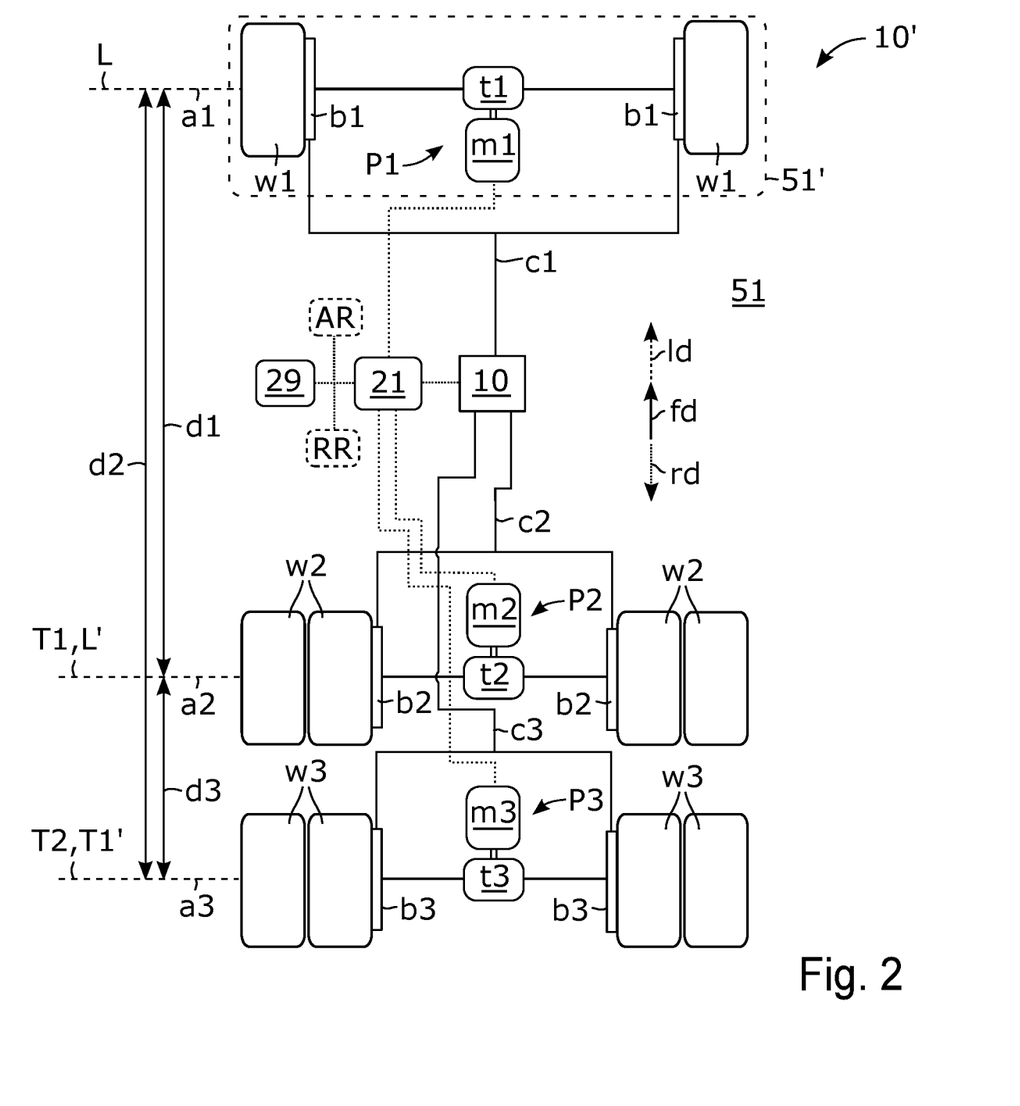
FIG. 2 schematically illustrates wheel axles, powertrains, and a wheel brake system of the vehicle illustrated in FIG. 1, FIG. 3 schematically illustrates the wheel axles, the powertrains, and the wheel brake system of the vehicle illustrated in FIG. 2 in which the vehicle has moved a distance in a forward moving direction of the vehicle relative to a surface supporting the vehicle, FIG. 4 schematically illustrates the wheel axles, the powertrains, and the wheel brake system of the vehicle illustrated in FIG. 1, wherein the vehicle comprising these components and systems moves in a reverse moving direction of the vehicle, FIG. 5 schematically illustrates a method of controlling operation of a vehicle.

FIG. 2 schematically illustrates the wheel axles a1, a2, a3, the powertrains P1, P2, P3, and a wheel brake system 10' of the vehicle 2 illustrated in FIG. 1. In FIG. 2, the components and systems are illustrated as viewed in a direction straight towards the surface 51 illustrated in FIG. 1, i.e., straight towards the surface 51 supporting the vehicle 2 in FIG. 1. Below, simultaneous reference is made to FIG. 1 and FIG. 2, if not indicated otherwise.

According to the illustrated embodiments, each powertrain P1, P2, P3 comprises a power source m1, m2, m3 configured to provide motive power to the vehicle 2 via the wheels w1, w2, w3 arranged at a respective wheel axle a1, a2, a3. Moreover, according to the illustrated embodiments, each of the powertrains P1, P2, P3 comprises a transmission t1, t2, t3 configured to transmit power between the power source m1, m2, m3 and the wheels w1, w2, w3 arranged at a respective wheel axle a1, a2, a3.

That is, in more detail, according to the illustrated embodiments, the first powertrain P1 comprises a first power source m1 configured to provide motive power to the vehicle 2 via the first transmission t1 and the wheels w1 arranged at the first wheel axle a1, the second powertrain P2 comprises a second power source m2 configured to provide motive power to the vehicle 2 via the second transmission t2 and the wheels w2 arranged at the second wheel axle a2, and the third powertrain P3 comprises a third power source m3 configured to provide motive power to the vehicle 2 via the third transmission t3 and the wheels w3 arranged at the third wheel axle a3. Each transmission t1, t2, t3 may comprise a number of torque transmission arrangements, including one or more of a driveshaft, a differential, an axle, a gearbox, a gear, and the like.

According to the illustrated embodiments, the power source m1, m2, m3 of the powertrains P1, P2, P3 of the vehicle 2 is an electric machine. That is, each of the first, second, and third power source m1, m2, m3 referred to above is an electric machine. The power source m1, m2, m3 of the powertrains P1, P2, P3 of the vehicle 2 are configured to operate using electricity from a propulsion battery 18 indicated in FIG. 1. The propulsion battery 18 may comprise a number of rechargeable battery cells, such as lithium-ion battery cells, lithium polymer battery cells, or the like.

According to the embodiments illustrated in FIG. 1, the vehicle 2 is a pure electric vehicle and comprises no internal combustion engine for provide motive power thereof.

As mentioned, according to the embodiments illustrated in FIG. 2, each of the powertrains P1, P2, P3 comprises a transmission t1, t2, t3 configured to transmit power between the power source m1, m2, m3 and the wheels w1, w2, w3 arranged at a respective wheel axle a1, a2, a3. However, according to some embodiments, one or more of the powertrains P1, P2, P3 of the vehicle 2 may comprise a pair of wheel motors each operably connected to one or more wheels w1, w2, w3 at a respective lateral side of the vehicle 2. Such a wheel motor may be operably connected to one or more wheels w1, w2, w3 at a wheel axle a1, a2, a3 via a transmission arranged in the vicinity of the one or more wheels w1, w2, w3 at the wheel axle a1, a2, a3. Moreover, the wheel motor and the transmission may be integrated a wheel hub of the vehicle 2. The transmission may for example comprise a driveshaft, a gear pair, epicyclic gearing, and an output shaft connected to the one or more wheels w1, w2, w3 at a wheel axle a1, a2, a3, or the like.

Moreover, according to some embodiments, one or more of the powertrains P1, P2, P3 of the vehicle 2 may comprise an internal combustion engine configured to provide motive power to the vehicle 2. Furthermore, one or more of the powertrains P1, P2, P3 of the vehicle 2 may comprise the combination of an internal combustion engine and an electric machine. Accordingly, the vehicle 2 as referred to herein may be a so-called hybrid electric vehicle 2. Moreover, according to some embodiments, the vehicle 2 may comprise an internal combustion engine as the only means for providing motive power to the vehicle 2.

Furthermore, according to some embodiments, one or more of the powertrains P1, P2, P3 of the vehicle 2 may comprise a retarder configured to provide braking power to the vehicle 2 via the wheels w1, w2, w3 arranged at a respective wheel axle a1, a2, a3 upon activation. Such a retarder may be of electric and/or hydraulic type.

According to the illustrated embodiments, each powertrain P1, P2, P3 of the vehicle 2 is separate from, and independent of, the other of the powertrains P1, P2, P3 of the vehicle 2. The feature that each powertrain P1, P2, P3 of the vehicle 2 is separate from the other of the powertrains P1, P2, P3 of the vehicle 2 means that the powertrains P1, P2, P3 are structurally separated and form distinct separate arrangements. The feature that each powertrain P1, P2, P3 of the vehicle 2 is independent of the other of the powertrains P1, P2, P3 of the vehicle 2 means that each powertrain P1, P2, P3 can be controlled independently of the other powertrains P1, P2, P3, i.e., can be controlled such that a control action changing the power output of the powertrain P1, P2, P3 does not need to result is a change in the power output of one or more of the other powertrains P1, P2, P3 of the vehicle 2.

As mentioned above, the vehicle 2 comprises a wheel brake system 10'. The wheel brake system 10' comprises wheel brakes b1, b2, b3 arranged at wheels w1, w2, w3 of each wheel axle a1, a2, a3 of the vehicle 2. The wheel brakes b1, b2, b3 are controllable to brake the wheels w1, w2, w3 arranged at each wheel axle a1, a2, a3 of the vehicle 2. The wheel brakes b1, b2, b3 may comprise friction brake arrangements, such as drum brakes, disc brakes, or a combination thereof. Drum brakes normally comprise a cylinder-shaped part called a brake drum and a set of shoes or pads controllable to be pressed against the cylinder-shaped part to create friction therebetween for braking the wheels w1, w2, w3. Disc brakes normally comprise a disc and a set of pads controllable to be pressed against the disc to create friction therebetween for braking the wheels w1, w2, w3.

The wheel brake system 10' further comprises a brake control unit 10 and a number of conduits c1, c2, c3 between the brake control unit 10 and the wheel brakes b1, b2, b3 arranged at the wheels w1, w2, w3 at the respective wheel axles a1, a2, a3.

According to some embodiments, the wheel brake system 10' is a pneumatic system in which the brake control unit 10 is configured to control operation of the wheel brakes b1, b2, b3 by controlling a pneumatic pressure fed to the wheel brakes b1, b2, b3 via the number of conduits c1, c2, c3. According to some further embodiments, the wheel brake system 10' is a hydraulic system in which the brake control unit 10 is configured to control operation of the wheel brakes b1, b2, b3 by controlling a hydraulic pressure fed to the wheel brakes b1, b2, b3 via the number of conduits c1, c2, c3.

In FIG. 2, the wheel brake system 10' is illustrated in simplified form. However, the wheel brake system 10' may be configured to perform an individual control of the application of the wheel brakes b1, b2, b3 at the respective wheels w1, w2, w3 upon control of the control arrangement 21, as is further explained herein.

In FIG. 1, a section 51' of the surface 51 supporting the vehicle 2 is indicated. In some examples below, this section 51' is assumed to constitute a road section having different friction properties than the remaining surface 51. If the vehicle 2 illustrated in FIG. 1 moves in the forward moving direction fd, the wheels w1 arranged at the first wheel axle a1 will first reach this section 51' of the surface.

In FIG. 2, the forward moving direction fd, the reverse moving direction rd, and the longitudinal direction ld of the vehicle 2 are indicated. The forward moving direction fd is shown with an arrow whereas the reverse moving direction rd is shown with a dotted arrow meaning that the vehicle 2 comprising the components and systems illustrated in FIG. 2 is moving in the forward moving direction fd relative to the surface 51.

As understood from above, and as is indicated in FIG. 2, the wheel axles a1, a2, a3 of the vehicle 2 are arranged at a distance d1, d2, d3 from each other as seen along the longitudinal direction ld of the vehicle 2. In other words, the wheel axles a1, a2, a3 of the vehicle 2 are arranged at different longitudinal positions on the vehicle 2, i.e., at different positions along the longitudinal direction ld of the vehicle 2. As indicated in FIG. 2, the second wheel axle a2 is arranged at a first distance d1 from the first wheel axle a1 as seen relative to the longitudinal direction ld of the vehicle 2, the third wheel axle a3 is arranged at a second distance d2 from the first wheel axle a1 as seen relative to the longitudinal direction ld of the vehicle 2. Likewise, the third wheel axle a3 is arranged at a third distance d3 from the second wheel axle a2 as seen relative to the longitudinal direction ld of the vehicle 2.

Moreover, as is indicated in FIG. 2, upon movement of the vehicle 2 in the forward moving direction fd, the first wheel axle a1 constitutes a leading wheel axle L as seen relative the forward moving direction fd and the relative longitudinal positions of the wheel axles a1, a2, a3. Consequently, the second wheel axle a2 forms a first trailing wheel axle T1 and the third wheel axle a3 forms a second trailing wheel axle T2 in relation to the first wheel axle a1 as seen relative to the forward moving direction fd and the relative longitudinal positions of the wheel axles a1, a2, a3.

Furthermore, as indicated in FIG. 2, as seen from the longitudinal position of the third wheel axle a3, the first wheel axle a1 constitutes a first leading wheel axle L and the second wheel axle a2 constitutes a second leading wheel axle L' upon movement of the vehicle 2 in the forward moving direction fd. In other words, as seen from the longitudinal position of the second wheel axle a2, the third wheel axle a3 constitutes a first trailing wheel axle T1'.

As understood from the above, the second wheel axle a2 constitutes a trailing wheel axle T1 relative to the first wheel axle a1 and constitutes a leading wheel axle L' relative to the third wheel axle a3 when the vehicle 2 is moving in the forward moving direction fd.

Moreover, as seen in FIG. 2, the vehicle 2 comprises a control arrangement 21. According to the illustrated embodiments, the control arrangement 21 is operably connected to each powertrain P1, P2, P3 of the vehicle 2 and to the wheel brake system 10'.

According to embodiments, the control arrangement 21 is configured to, when the vehicle 2 is moving in a movement direction fd, rd relative to a surface 51 supporting the vehicle 2 such that at least one of the two or more wheel axles a1, a2, a3 constitutes a leading wheel axle L, L' and at least one of the two or more wheel axles a1, a2, a3 constitutes a trailing wheel axle T1, T1', T2 as seen relative to the movement direction fd, rd and the longitudinal relative positions of the wheel axles a1, a2, a3 of the vehicle 2, monitor a wheel slip of the wheels w1, w2, w3 arranged at the at least one leading wheel axle L, L'.

That is, in the illustrated example in FIG. 2, as mentioned, the first wheel axle a1 constitutes a leading wheel axle L as seen relative the forward moving direction fd and the relative longitudinal positions of the other wheel axles a2, a3 of the vehicle 2. The monitoring of the wheel slip of the first wheel axle a1 performed by the control arrangement 21 may detect the presence of the section 51' of the surface 51 having different friction properties than the remaining surface 51. As seen in FIG. 2, the wheels w1 arranged at the first wheel axle a1 are positioned at the section 51' of the surface 51. The wheel slip may be monitored using input from wheel speed sensors arranged to monitor the rotational speed of the wheels w1, w2, w3 arranged at the at least one leading wheel axle L, L', i.e., the wheels w1 arranged at the first wheel axle a1 according to the illustrated example.

Figure 3:
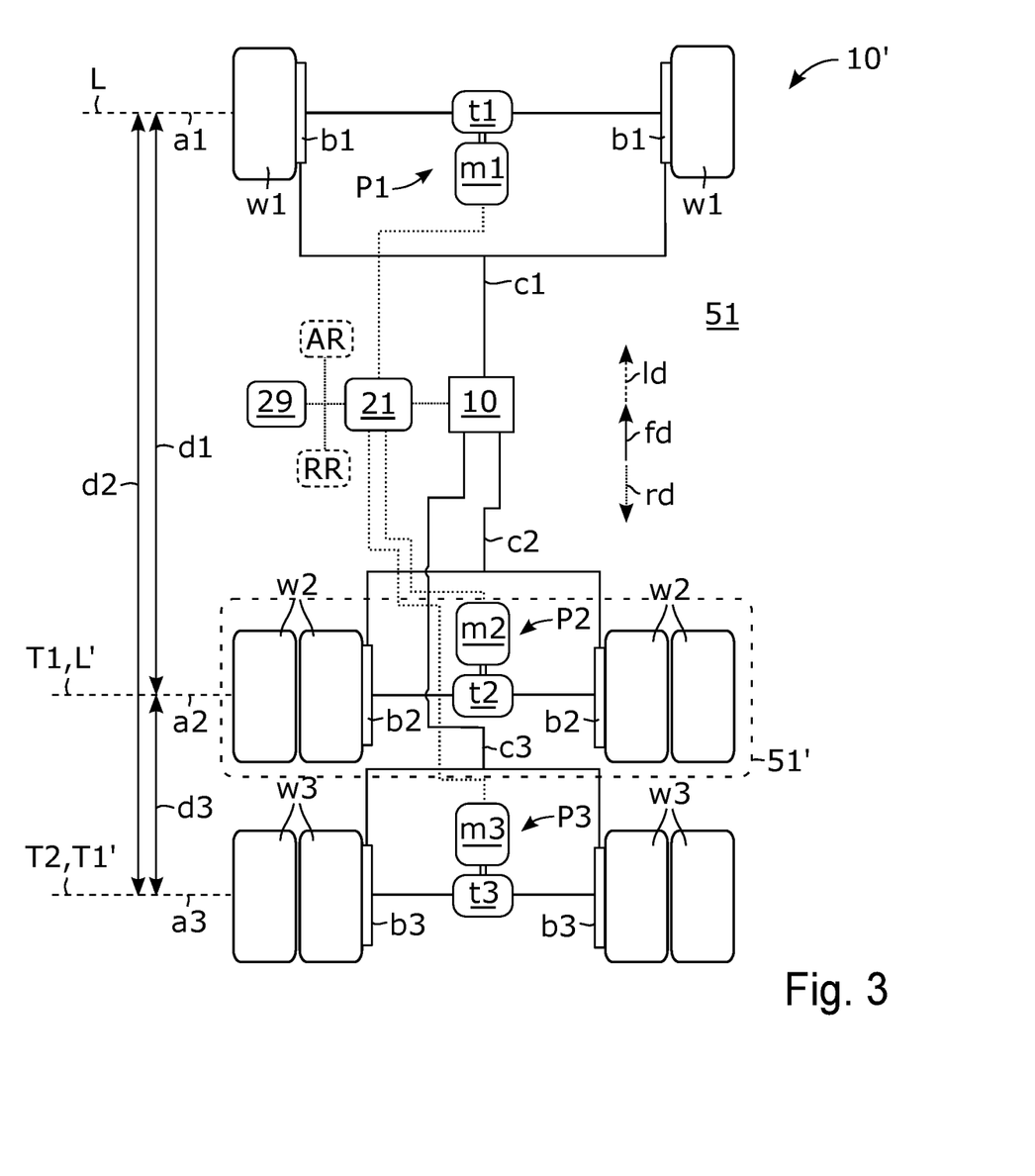

FIG. 3 schematically illustrates the wheel axles a1, a2, a3, the powertrains P1, P2, P3, and the wheel brake system 10' of the vehicle 2 illustrated in FIG. 2 in which the vehicle 2 has moved a distance d1 in the forward moving direction fd of the vehicle 2 relative to the surface 51. Below, simultaneous reference is made to FIG. 1-FIG. 3, if not indicated otherwise.

According to embodiments herein, the control arrangement 21 is configured to control a wheel torque of the wheels w1, w2, w3 arranged at the at least one trailing wheel axle T1, T1', T2 based on the monitored wheel slip of at least one leading wheel axle L, L', a speed of the vehicle 2 relative to the surface 51, and the distance/distances d1, d2, d3 between the at least one leading wheel axle L, L' and the at least one trailing wheel axle T1, T1', T2.

As seen in the illustrated example of FIG. 3, the wheels w2 arranged at the second wheel axle a2 are positioned on the section 51' of the surface 51. As mentioned, the wheels w2 arranged at the second wheel axle a2 constitutes a trailing wheel axle T1 relative to the first wheel axle a1 when the vehicle 2 is moving in the forward moving direction fd. Therefore, in the illustrated example, the control arrangement 21 controls the wheel torque of the wheels w2 arranged at the second wheel axle a2 based on the monitored wheel slip of the wheels w1 arranged at the first wheel axle a1, the speed of the vehicle 2 relative to the surface 51, and the distance d1 between the first wheel axle a1 and the second wheel axle a2.

Thereby, the control arrangement 21 can control the wheel torque of the wheels w2 arranged at the second wheel axle a2 in a predictive and proactive manner based on the monitored wheel slip of the wheels w1 arranged at the first wheel axle a1.

In more detail, according to the illustrated embodiments, the control arrangement 21 is configured to control the wheel torque of the wheels w1, w2, w3 arranged at the at least one trailing wheel axle T1, T1', T2 using a time delay from the monitored wheel slip of the wheels w1, w2, w3 arranged at the at least one leading wheel axle L, L'. Moreover the duration of the time delay is set based on the ratio between the distance/distances d1, d2, d3 between the at least one leading wheel axle L, L' and the at least one trailing wheel axle T1, T1', T2 and the speed of the vehicle 2 relative to the surface 51.

That is, if the duration of the time delay is denoted "T", the speed of the vehicle 2 relative to the surface 51 is denoted "V", and the distance/distances d1, d2, d3 between the at least one leading wheel axle L, L' and the at least one trailing wheel axle T1, T1', T2 is denoted "D", the duration of the time delay can be set based on the following equation:

$$T = D/V.$$

The speed V of the vehicle 2 may be represented by an average speed of the vehicle 2 which starts to be monitored/calculated at the point in time in which the wheel slip of the wheels w1, w2, w3 of the at least one leading wheel axle L, L' is monitored.

As understood from the above, according to the illustrated embodiments, the control arrangement 21 controls the wheel torque of the wheels w2 arranged at the second wheel axle a2 using a time delay from the point in time the wheel slip of the wheels w1 arranged at the first wheel axle a1 was monitored, wherein the duration of the time delay is set based on the ratio between the speed of the vehicle 2 relative to the surface 51, and the distance d1 between the first and second wheel axles a1, a2.

In this manner, the control of the wheel torque of the wheels w2 arranged at the second wheel axle a2 can be started when the wheels w2 arranged at the second wheel axle a2 reaches the section 51' of the surface 51 at which the wheel slip of the wheels w1 arranged at the first wheel axle a1 was monitored. According to some embodiments, the duration of the time period may be set such that the control of the wheel torque of the wheels w2 arranged at the second wheel axle a2 is started just before the wheels w2 of the second wheel axle a2 reaches the section 51' of the surface 51 at which the wheel slip of the wheels w1 arranged at the first wheel axle a1 was monitored.

That is, as understood from the above, in general, the control of the wheel torque of the wheels w1, w2, w3 arranged at the at least one trailing wheel axle T1, T1', T2 can be started when the wheels w1, w2, w3 arranged at the at least one trailing wheel axle T1, T1', T2 reaches a section 51' of a surface 51 at which the wheel slip of the wheels w1, w2, w3 arranged at the at least one leading wheel axle L, L' was monitored. Moreover, as understood from the above, in general, the duration of the time period may be set such that the control of the wheel torque of the wheels w1, w2, w3 arranged at the at least one trailing wheel axle T1, T1', T2 is started just before the wheels w1, w2, w3 arranged at the at least one trailing wheel axle T1, T1', T2 reaches a section 51' of a surface 51 at which the wheel slip of the wheels w1, w2, w3 arranged at the at least one leading wheel axle L, L' was monitored.

The control arrangement 21 may be configured to control the wheel torque of the wheels w1, w2, w3 arranged at the at least one trailing wheel axle T1, T1', T2 by controlling the power output of the power source m1, m2, m3 of the powertrain P1, P2, P3 of the wheel axle a1, a2, a3. That is, in the illustrated example, the control arrangement 21 may control the power output of the power source m2 of the second powertrain P2 based on the monitored wheel slip of the wheels w1 arranged at the first wheel axle a1 using a time delay according to the above.

As an alternative, or in addition, the control arrangement 21 may be configured to control the wheel torque of the wheels w1, w2, w3 arranged at the at least one trailing wheel axle T1, T1', T2 by controlling the braking power of a retarder of the powertrain P1, P2, P3 of the at least one trailing wheel axle T1, T1', T2. That is, in the illustrated example, the control arrangement 21 may control the braking power of a retarder of the second powertrain P2 based on the monitored wheel slip of the wheels w1 arranged at the first wheel axle a1 using a time delay according to the above.

As an alternative, or in addition, the control arrangement 21 may be configured to control the wheel torque of the wheels w1, w2, w3 arranged at the at least one trailing wheel axle T1, T1', T2 by controlling operation of the wheel brakes b1, b2, b3 of the wheel axle a1, a2, a3. That is, in the illustrated example, the control arrangement 21 may control operation of the wheel brakes b2 of the second wheel axle a2 based on the monitored wheel slip of the wheels w1 arranged at the first wheel axle a1 using a time delay according to the above.

According to some embodiments, the control arrangement 21 is configured to detect a change in the wheel slip of the wheels w1, w2, w3 arranged at the at least one leading wheel axle L, L' and is configured to adjust the wheel torque of the wheels w1, w2, w3 arranged at the at least one trailing wheel axle T1, T1', T2 based on a magnitude of the detected change in the wheel slip of the wheels w1, w2, w3 arranged at the at least one leading wheel axle L, L'.

That is, in the illustrated example, the control arrangement 21 may detect a change in the wheel slip of the wheels w1 arranged at the first wheel axle a1 and may in response thereto adjust the wheel torque of the wheels w2 arranged at the second wheel axle a2 based on a magnitude of the detected change in the wheel slip of the wheels w1 arranged at the first wheel axle a1.

Moreover, according to some embodiments, the control arrangement 21 is configured to adjust the wheel torque of the wheels w1, w2, w3 arranged at one or more other wheel axles a1, a2, a3 of the two or more wheel axles a1, a2, a3 with a combined magnitude set to compensate for the adjustment of the wheel torque of the wheels w1, w2, w3 arranged at the at least one trailing wheel axle T1, T1', T2.

That is, in the illustrated example, the control arrangement 21 may adjust the wheel torque of the wheels w1, w3 arranged at the first and third wheel axles a1, a3 with a combined magnitude set to compensate for the adjustment of the wheel torque of the wheels w2 arranged at the second wheel axle a2. In this manner, conditions are provided for a smooth, predictive, and controlled of operation of the vehicle 2. Moreover, a total propulsion force or braking force on the vehicle 2 can be kept at least substantially constant also when the wheel torque of the wheels w1, w2, w3 arranged at the at least one trailing wheel axle T1, T1', T2 is adjusted.

Furthermore, according to some embodiments, the control arrangement 21 is configured to provide a friction coefficient estimate between the surface 51 and the wheels w1, w2, w3 arranged at the at least one leading wheel axle L, L' based on the monitored wheel slip, and is configured to adjust the wheel torque of the wheels w1, w2, w3 arranged at the at least one trailing wheel axle T1, T1', T2 based on the provided friction coefficient estimate.

In other words, in the illustrated example, the control arrangement 21 may provide a friction coefficient estimate between the surface 51, 51' and the wheels w1 arranged at the first wheel axle a1 based on the monitored wheel slip and may adjust the wheel torque of the wheels w2 arranged at the second wheel axle a2 based on the provided friction coefficient estimate.

According to some embodiments, the control arrangement 21 may be configured to monitor the wheel slip of the wheels w1, w2, w3 of the at least one leading wheel axle L, L' during torque transfer between the powertrain P1, P2, P3 of the at least one leading wheel axle L, L' and the wheels w1, w2, w3 arranged at the at least one leading wheel axle L, L'. That is, according to the illustrated example, the control arrangement 21 may monitor the wheel slip of the wheels w1 arranged at the first wheel axle a1 during torque transfer between the first powertrain P1 and the wheels w1 arranged at the first wheel axle a1.

As an alternative, or in addition, the control arrangement 21 may be configured to monitor the wheel slip of the wheels w1, w2, w3 of the at least one leading wheel axle L, L' during torque transfer between the wheel brakes b1, b2, b3 of the at least one leading wheel axle L, L' and the wheels w1, w2, w3 arranged at the at least one leading wheel axle L, L'. That is, according to the illustrated example, the control arrangement 21 may monitor the wheel slip of the wheels w1 arranged at the first wheel axle a1 during torque transfer between the wheel brakes b1 of the first wheel axle a1 and the wheels w1 arranged at the first wheel axle a1.

As a first example of a driving situation with reference to FIG. 1-FIG. 3, if the vehicle 2 is moving in the forward moving direction fd along a surface 51 comprising a section 51' having significantly lower friction than the remaining part of the surface 51 and the vehicle 2 is accelerating in the forward moving direction fd of the vehicle 2 following the receipt of an acceleration request AR, the wheels w1 arranged at the first wheel axle a1 may start to rotate faster when the wheels w1 reaches the section 51' due to significant wheel slip of the wheels w1 which can be monitored by the control arrangement 21. In FIG. 2 and FIG. 3, the acceleration request AR is schematically indicated inside a dashed box.

The control arrangement 21 may be configured to reduce the wheel slip of the wheels w1 arranged at the first wheel axle a1 by controlling operation of the power source m1 of the first powertrain P1 and/or by controlling operation of the wheel brakes b1 of the first wheel axle a1. The control arrangement 21 may start to increase the wheel torque of the wheels w1 arranged at the first wheel axle a1 gradually as the friction of the surface 51 starts to increase upon movement of the vehicle 2 in the forward moving direction fd.

When the section 51' of the surface 51 reaches the wheels w2 arranged at the second wheel axle a2, as is illustrated in FIG. 3, the control arrangement 21 can reduce the power output of the power source m2 of the second powertrain P2 so as to avoid excessive wheel slip of the wheels w2 arranged at the second wheel axle a2 when the section 51' of the surface 51 reaches the wheels w2 arranged at the second wheel axle a2. Moreover, as mentioned, the control arrangement 21 may be configured to adjust the power output of the power sources m1, m3 of the first and third powertrains P1, P3 with a combined magnitude set to compensate for the reduction in power output of the power source m2 of the second powertrain P2.

As a second example of a driving situation with reference to FIG. 1-FIG. 3, if the vehicle 2 again is moving in the forward moving direction fd along a surface 51 comprising a section 51' having significantly lower friction than the remaining part of the surface 51 and the vehicle 2 is decelerating in the forward moving direction fd of the vehicle 2 following the receipt of an retardation request RR, the wheels w1 arranged at the first wheel axle a1 may start to rotate slower when the wheels w1 reaches the section 51' due to wheel slip of the wheels w1 which can be monitored by the control arrangement 21. In FIG. 2 and FIG. 3, the retardation request RR is schematically indicated inside a dashed box.

The control arrangement 21 may be configured to reduce the wheel slip of the wheels w1 arranged at the first wheel axle a1 by reducing a negative wheel torque by controlling operation of the power source m1 of the first powertrain P1 and/or by controlling operation of the wheel brakes b1 of the first wheel axle a1. The control arrangement 21 may start to increase a negative wheel torque of the wheels w1 arranged at the first wheel axle a1 gradually as the friction of the surface 51 starts to increase upon movement of the vehicle 2 in the forward moving direction fd.

When the section 51' of the surface 51 reaches the wheels w2 arranged at the second wheel axle a2, as is illustrated in FIG. 3, the control arrangement 21 can reduce the application of a negative wheel torque to the wheels w2 arranged at the second wheel axle a2 so as to avoid excessive wheel slip of the wheels w2 arranged at the second wheel axle a2. The control arrangement 21 may reduce the application of a negative wheel torque to the wheels w2 arranged at the second wheel axle a2 by controlling operation of the power source m2 of the second powertrain P2, by controlling operation of a retarder of the second powertrain P2, and/or by controlling the wheel brakes b2 of the second wheel axle a2.

Moreover, as mentioned, the control arrangement 21 may be configured to adjust the wheel torque of the wheels w1, w3 arranged at the first and third wheel axles a1, a3 with a combined magnitude set to compensate for the reduction of the negative wheel torque to the wheels w2 arranged at the second wheel axle a2. In this manner, an even and smooth retardation force can be provided to the vehicle 2.

As used herein, the term "negative wheel torque" means a wheel torque causing a force onto the vehicle 2 in the reverse moving direction rd of the vehicle 2. Likewise, the term "positive wheel torque" means a wheel torque causing a force onto the vehicle 2 in the forward moving direction fd of the vehicle 2.

The acceleration request AR referred to above may be received from an actuator arranged in a driver environment 55 of the vehicle 2, such as an accelerator pedal, and/or from a control device 29 of the vehicle 2. Likewise, the retardation request RR referred to above may be received from an actuator arranged in a driver environment 55 of the vehicle 2, such as a brake pedal, and/or from a control device 29 of the vehicle 2. The control device 29, and/or the control arrangement 21, may form part of an autonomous driving system of the vehicle 2. The autonomous driving system may be capable of operating the vehicle 2 in an at least partially autonomous manner based on input from a number of sensor devices, i.e., at least in part in a manner not requiring the direct intervention of a human. According to some embodiments, the autonomous driving system may be configured to drive, i.e., steer, brake, and/or propel, the vehicle 2 based on input from a number of sensor devices in a manner not requiring the direct intervention of a human. The number of sensor devices may comprise one or more of a Radio Detection and Ranging (radar) sensor, a Light Detection and Ranging (lidar) sensor, an image capturing unit, such as a camera, an ultrasound sensor, or the like.

The above given examples with reference to FIG. 1-FIG. 3 applies mutatis mutandis if the section 51' constitutes a section having higher friction than the remaining part of the surface 51.

When the section 51' of the surface 51 reaches the wheels w3 arranged at the third wheel axle a3, the control arrangement 21 can control the wheel torque of the wheels w3 arranged at the third wheel axle a3 based on the monitored wheel slip of the wheels w1 arranged at the first wheel axle a1 using a time delay set by the ratio between the distance d2 between the first and third wheel axles a1, a3 and the speed of the vehicle 2 relative to the surface 51.

In addition, as mentioned above, the second wheel axle a2 constitutes a second leading wheel axle L' relative to the third wheel axle a3 when the vehicle 2 is moving in the forward moving direction fd. Therefore, according to some embodiments, the control arrangement 21 may monitor the wheel slip of the wheels w2 arranged at the second wheel axle a2 and may control the wheel torque of the wheels w3 arranged at the third wheel axle a3 based on the monitored wheel slip of the wheels w2 arranged at the second wheel axle a2. Such a control may be performed using a time delay set by the ratio between the distance d3 between the second and third wheel axles a2, a3 and the speed of the vehicle 2 relative to the surface 51.

Figure 4:
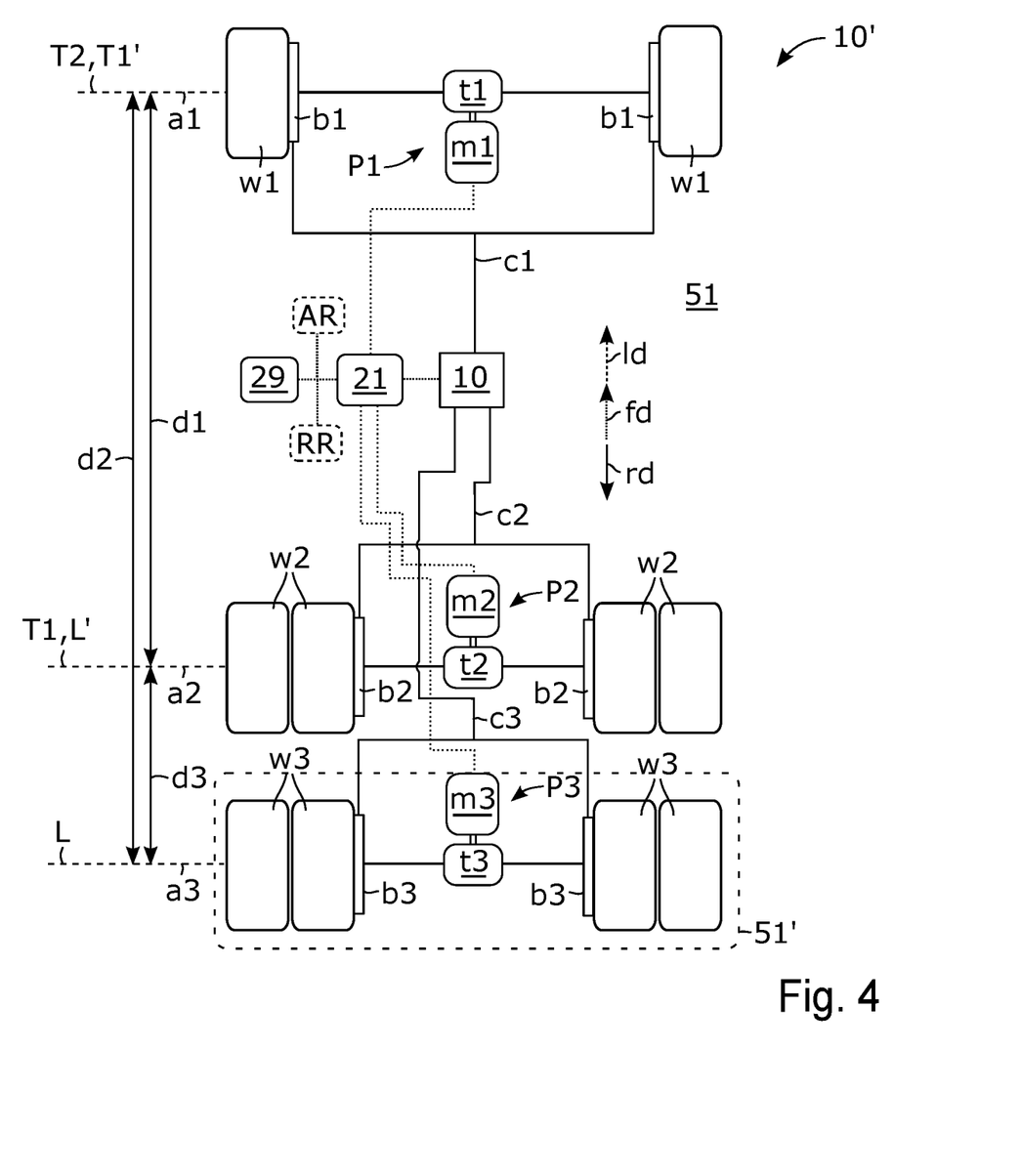

FIG. 4 schematically illustrates the wheel axles a1, a2, a3, the powertrains P1, P2, P3, and the wheel brake system 10' of the vehicle 2 illustrated in FIG. 1. In FIG. 4, the components and systems are illustrated as viewed in a direction straight towards the surface 51 illustrated in FIG. 1. Below, simultaneous reference is made to FIG. 1 and FIG. 4, if not indicated otherwise.

In FIG. 4, the section 51' of the surface 51 supporting the vehicle 2 is illustrated as positioned at the wheels w3 arranged at the third wheel axle a3. Moreover, the vehicle 2 comprising the components and systems illustrated in FIG. 4 is illustrated as moving in the reverse moving direction rd of the vehicle 2 which is indicated with the full arrow pointing in the reverse moving direction rd whereas the forward moving direction fd is indicated with a dotted arrow in FIG. 4.

As is indicated in FIG. 4, upon movement of the vehicle 2 in the reverse moving direction rd, the third wheel axle a3 constitutes a leading wheel axle L as seen relative the reverse moving direction rd and the relative longitudinal positions of the wheel axles a1, a2, a3. Consequently, the second wheel axle a2 forms a first trailing wheel axle T1 and the first wheel axle a1 forms a second trailing wheel axle T2 relative to the third wheel axle a3 upon movement of the vehicle 2 in the reverse moving direction rd.

Furthermore, as indicated in FIG. 4, as seen from the longitudinal position of the first wheel axle a1, the third wheel axle a3 constitutes a first leading wheel axle L and the second wheel axle a2 constitutes a second leading wheel axle L' upon movement of the vehicle 2 in the reverse moving direction rd. In other words, as seen from the longitudinal position of the second wheel axle a2, the first wheel axle a1 constitutes a first trailing wheel axle T1'. As understood from the above, the second wheel axle a2 constitutes a trailing wheel axle T1 relative to the third wheel axle a3 and constitutes a leading wheel axle L' relative to the first wheel axle a1 when the vehicle 2 moves in the reverse moving direction rd.

According to the illustrated embodiments, the control arrangement 21 is capable of performing the control as explained with reference to FIG. 2 and FIG. 3 also when the vehicle 2 is reversing, i.e., is moving in the reverse moving direction rd.

The control arrangement 21 may thus monitor wheel slip of the wheels w3 arranged at the third wheel axle a3 and may control the wheel slip of the wheels w2 arranged at the second wheel axle a2 based on the monitored wheel slip when the vehicle 2 is moving in the reverse moving direction rd. The control may be performed using a time delay set by the ratio between the distance d3 between the second and third wheel axles a2, a3 and the speed of the vehicle 2 relative to the surface 51 in the reverse moving direction rd.

The control arrangement 21 may operate in a corresponding manner as explained with reference to FIG. 2 and FIG. 3. These aspects are not further explained again in detail herein for reasons of brevity and clarity.

Figure 5:
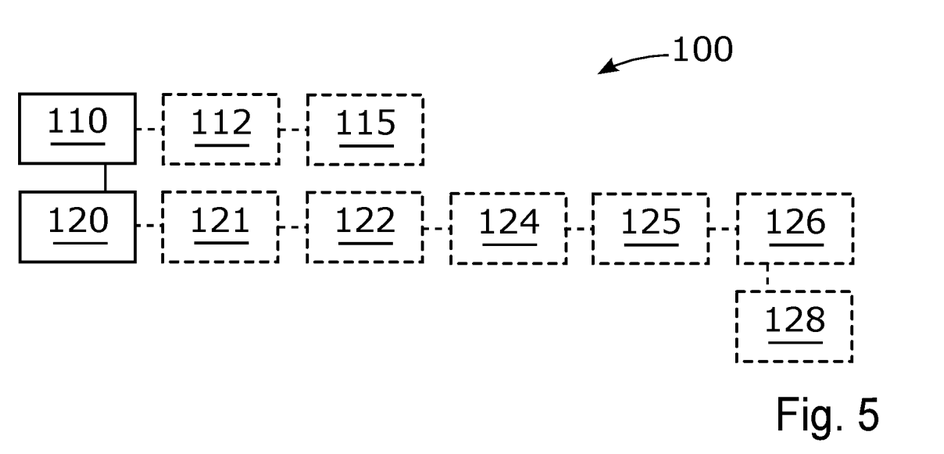

FIG. 5 schematically illustrates a method 100 of controlling operation of a vehicle. The vehicle may be a vehicle 2 as explained with reference to FIG. 1-FIG. 4. Therefore, below, simultaneous reference is made to FIG. 1-FIG. 5, if not indicated otherwise. The method 100 is performed by a control arrangement 21, and wherein the vehicle 2 comprises two or more wheel axles a1, a2, a3 and a number of wheels w1, w2, w3 arranged at each of the two or more wheel axles a1, a2, a3. The method 100 comprises the steps of, when the vehicle 2 is moving in a movement direction fd, rd relative to a surface 51 supporting the vehicle 2 such that at least one of the two or more wheel axles a1, a2, a3 constitutes a leading wheel axle L, L' and at least one of the two or more wheel axles a1, a2, a3 constitutes a trailing wheel axle T1, T1', T2 as seen relative to the movement direction fd, rd:

monitoring 110 a wheel slip of the wheels w1, w2, w3 arranged at the at least one leading wheel axle L, L', and     controlling 120 a wheel torque of the wheels w1, w2, w3 arranged at the at least one trailing wheel axle T1, T1', T2 based on the monitored wheel slip, a speed of the vehicle 2 relative to the surface 51, and the distance/distances d1, d2, d3 between the at least one leading wheel axle L, L' and the at least one trailing wheel axle T1, T1', T2.

As is indicated in FIG. 5, the step of controlling 120 the wheel torque of the wheels w1, w2, w3 arranged at the at least one trailing wheel axle T1, T1', T2 may comprise:

controlling 121 the wheel torque of the wheels w1, w2, w3 arranged at the at least one trailing wheel axle T1, T1', T2 using a time delay from the monitored wheel slip of the wheels w1, w2, w3 arranged at the at least one leading wheel axle L, L', wherein a duration of the time delay is set based on the ratio between the distance/distances d1, d2, d3 between the at least one leading wheel axle L, L' and the at least one trailing wheel axle T1, T1', T2 and the speed of the vehicle 2 relative to the surface 51.

Moreover, as is indicated in FIG. 5, the step of monitoring 110 the wheel slip may comprise:

detecting 112 a change in the wheel slip of the wheels w1, w2, w3 arranged at the at least one leading wheel axle L, L', and wherein the step of controlling 120, 121 the wheel torque of the wheels w1, w2, w3 arranged at the at least one trailing wheel axle T1, T1', T2 comprises:

adjusting 122 the wheel torque of the wheels w1, w2, w3 arranged at the at least one trailing wheel axle T1, T1', T2 based on a magnitude of the detected change in the wheel slip of the wheels w1, w2, w3 arranged at the at least one leading wheel axle L, L'.

Furthermore, as is indicated in FIG. 5, the method 100 may comprise the step of:

adjusting 124 the wheel torque of the wheels w1, w2, w3 arranged at one or more other wheel axles a1, a2, a3 of the two or more wheel axles a1, a2, a3 with a combined magnitude set to compensate for the adjustment of the wheel torque of the wheels w1, w2, w3 arranged at the at least one trailing wheel axle T1, T1', T2.

Optionally, the method 100 comprises the step of:

providing 115 a friction coefficient estimate between the surface 51 and the wheels w1, w2, w3 arranged at the at least one leading wheel axle L, L' based on the monitored wheel slip, and wherein the step of controlling 120, 121 the wheel torque of the wheels w1, w2, w3 arranged at the at least one trailing wheel axle T1, T1', T2 comprises:

adjusting 125 the wheel torque of the wheels w1, w2, w3 arranged at the at least one trailing wheel axle T1, T1', T2 based on the provided friction coefficient estimate.

Optionally, the vehicle 2 comprises a powertrain P1, P2, P3 configured to provide motive power to the vehicle 2 via the wheels w1, w2, w3 arranged at the at least one trailing wheel axle T1, T1', T2, and wherein the step of controlling 120, 121, 125 the wheel torque of the wheels w1, w2, w3 arranged at the at least one trailing wheel axle T1, T1', T2 comprises:

controlling 126 operation of the powertrain P1, P2, P3 of the at least one trailing wheel axle T1, T1', T2.

According to some embodiments, the vehicle 2 comprises a powertrain P1, P2, P3 configured to provide motive power to the vehicle 2 via the wheels w1, w2, w3 arranged at the at least one leading wheel axle L, L', and wherein the step of monitoring 110 the wheel slip is performed during torque transfer between the powertrain P1, P2, P3 of the at least one leading wheel axle L, L' and the wheels w1, w2, w3 arranged at the at least one leading wheel axle L, L'.

Optionally, the vehicle 2 comprises wheel brakes b1, b2, b3 controllable to brake the wheels w1, w2, w3 arranged at each of the two or more wheel axles a1, a2, a3 of the vehicle 2, and wherein the step of controlling 120, 121, 125 the wheel torque of the wheels w1, w2, w3 arranged at the at least one trailing wheel axle T1, T1', T2 comprises:

controlling 128 operation of the wheel brakes b1, b2, b3 of the at least one trailing wheel axle T1, T1', T2.

Optionally, the vehicle 2 comprises wheel brakes b1, b2, b3 controllable to brake the wheels w1, w2, w3 arranged at each of the two or more wheel axles a1, a2, a3 of the vehicle 2, and wherein the step of monitoring 110 the wheel slip is performed during torque transfer between the wheel brakes b1, b2, b3 of the at least one leading wheel axle L, L' and the wheels w1, w2, w3 arranged at the at least one leading wheel axle L, L'.

It will be appreciated that the various embodiments described for the method 100 are all combinable with the control arrangement 21 as described herein. That is, the control arrangement 21 may be configured to perform any one of the method steps 110, 112, 115, 120, 121, 122, 124, 125, 126, and 128 of the method 100.

Figure 6:
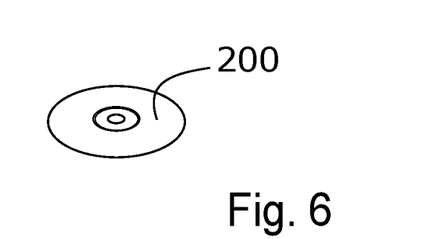
FIG. 6 illustrates a computer-readable medium.

FIG. 6 illustrates a computer-readable medium 200 comprising instructions which, when executed by a computer, cause the computer to carry out the method 100 according to some embodiments of the present disclosure. According to some embodiments, the computer-readable medium 200 comprises a computer program comprising instructions which, when the program is executed by a computer, cause the computer to carry out the method 100 according to some embodiments.

One skilled in the art will appreciate that the method 100 of controlling operation of a vehicle 2 may be implemented by programmed instructions. These programmed instructions are typically constituted by a computer program, which, when it is executed in the control arrangement 21, ensures that the control arrangement 21 carries out the desired control, such as the method steps 110, 112, 115, 120, 121, 122, 124, 125, 126, and 128. The computer program is usually part of a computer program product 200 which comprises a suitable digital storage medium on which the computer program is stored.

The control arrangement 21 may comprise a calculation unit which may take the form of substantially any suitable type of processor circuit or microcomputer, e.g., a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g., a memory card, a flash memory, a USB memory, a hard disc, or another similar volatile or non-volatile storage unit for storing data such as e.g., ROM (Read-Only Memory), PROM (Programmable Read-Only Memory), EPROM (Erasable PROM), EEPROM (Electrically Erasable PROM), etc. in different embodiments.

The control arrangement 21 may be connected to components of the vehicle 2 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the vehicle 2 for receiving and sending input and output signals may take the form of one or more from among a cable, a data bus, e.g., a CAN (controller area network) bus, a MOST (media orientated systems transport) bus or some other bus configuration, or a wireless connection.

In the embodiments illustrated, the vehicle 2 comprises a control arrangement 21 but might alternatively be implemented wholly or partly in two or more control arrangements or two or more control units. Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles of the type here concerned are therefore often provided with significantly more control arrangements than depicted in FIG. 2, as one skilled in the art will surely appreciate.

The computer program product 200 may be provided for instance in the form of a data carrier carrying computer program code for performing at least some of the method steps 110, 112, 115, 120, 121, 122, 124, 125, 126, and 128 according to some embodiments when being loaded into one or more calculation units of the control arrangement 21. The data carrier may be, e.g. a CD ROM disc, as is illustrated in FIG. 6, or a ROM (read-only memory), a PROM (programable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control arrangement 21 remotely, e.g., over an Internet or an intranet connection, or via other wired or wireless communication systems.

The method 100, as referred to herein, may also be referred to as a method 100 of controlling operation of at least one powertrain P1, P2, P3 and/or wheel brakes b1, b2, b3 of a vehicle 2.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A method of controlling operation of a vehicle, wherein the method is performed by a control arrangement, and wherein the vehicle comprises two or more wheel axles and a number of wheels arranged at each of the two or more wheel axles, wherein the method comprises, when the vehicle is moving in a movement direction relative to a surface supporting the vehicle such that at least one of the two or more wheel axles constitutes a leading wheel axle and at least one of the two or more wheel axles constitutes a trailing wheel axle as seen relative to the movement direction:
monitoring a wheel slip of the wheels arranged at the at least one leading wheel axle; and
controlling a wheel torque of the wheels arranged at the at least one trailing wheel axle based on: (i) the monitored wheel slip, (ii) a speed of the vehicle relative to the surface, and (iii) distance between the at least one leading wheel axle and the at least one trailing wheel axle, and wherein controlling the wheel torque of the wheels arranged at the at least one trailing wheel axle further comprises:
using a time delay from the monitored wheel slip of the wheels arranged at the at least one leading wheel axle, wherein a duration of the time delay is set based on a ratio between the distance between the at least one leading wheel axle and the at least one trailing wheel axle and the speed of the vehicle relative to the surface.

2. The method according to claim 1,
wherein the step of monitoring the wheel slip comprises:
detecting a change in the wheel slip of the wheels arranged at the at least one leading wheel axle; and
wherein the step of controlling the wheel torque of the wheels arranged at the at least one trailing wheel axle comprises:
adjusting the wheel torque of the wheels arranged at the at least one trailing wheel axle based on a magnitude of the detected change in the wheel slip of the wheels arranged at the at least one leading wheel axle.

3. The method according to claim 2, wherein the method comprises:
adjusting the wheel torque of the wheels arranged at one or more other wheel axles of the two or more wheel axles with a combined magnitude set to compensate for the adjustment of the wheel torque of the wheels arranged at the at least one trailing wheel axle.

4. The method according to claim 1, wherein the method comprises:
providing a friction coefficient estimate between the surface and the wheels arranged at the at least one leading wheel axle based on the monitored wheel slip, and
wherein controlling the wheel torque of the wheels arranged at the at least one trailing wheel axle comprises:
adjusting the wheel torque of the wheels arranged at the at least one trailing wheel axle based on the provided friction coefficient estimate.

5. The method according to claim 1, wherein the vehicle comprises a powertrain configured to provide motive power to the vehicle via the wheels arranged at the at least one trailing wheel axle, and wherein controlling (120, 121, 125) the wheel torque of the wheels arranged at the at least one trailing wheel axle comprises:
controlling operation of the powertrain of the at least one trailing wheel axle.

6. The method according to claim 1, wherein the vehicle comprises a powertrain configured to provide motive power to the vehicle via the wheels arranged at the at least one leading wheel axle, and wherein monitoring the wheel slip is performed during torque transfer between the powertrain of the at least one leading wheel axle and the wheels arranged at the at least one leading wheel axle.

7. The method according to claim 1, wherein the vehicle comprises wheel brakes controllable to brake the wheels arranged at each of the two or more wheel axles of the vehicle, and wherein controlling the wheel torque of the wheels arranged at the at least one trailing wheel axle comprises:
controlling operation of the wheel brakes of the at least one trailing wheel axle.

8. The method according to claim 1, wherein the vehicle comprises wheel brakes controllable to brake the wheels arranged at each of the two or more wheel axles of the vehicle, and wherein the monitoring the wheel slip is performed during torque transfer between the wheel brakes of the at least one leading wheel axle and the wheels arranged at the at least one leading wheel axle.

9. A computer program product stored on a non-transitory computer-readable medium, said computer program product for controlling operation of a vehicle, wherein the vehicle comprises two or more wheel axles and a number of wheels arranged at each of the two or more wheel axles, wherein said computer program product comprising computer instructions to cause one or more computer processors to perform the following operations, when the vehicle is moving in a movement direction relative to a surface supporting the vehicle such that at least one of the two or more wheel axles constitutes a leading wheel axle and at least one of the two or more wheel axles constitutes a trailing wheel axle as seen relative to the movement direction:
   monitoring a wheel slip of the wheels arranged at the at least one leading wheel axle; and
   controlling a wheel torque of the wheels arranged at the at least one trailing wheel axle based on: (i) the monitored wheel slip, (ii) a speed of the vehicle relative to the surface, and (iii) distance between the at least one leading wheel axle and the at least one trailing wheel axle, and wherein controlling the wheel torque of the wheels arranged at the at least one trailing wheel axle further comprises:
      using a time delay from the monitored wheel slip of the wheels arranged at the at least one leading wheel axle, wherein a duration of the time delay is set based on a ratio between the distance between the at least one leading wheel axle and the at least one trailing wheel axle and the speed of the vehicle relative to the surface.

10. A control arrangement configured to control operation of a vehicle, wherein the vehicle comprises two or more wheel axles and a number of wheels arranged at each of the two or more wheel axles, and wherein the control arrangement is configured to, when the vehicle is moving in a movement direction relative to a surface supporting the vehicle such that at least one of the two or more wheel axles constitutes a leading wheel axle and at least one of the two or more wheel axles constitutes a trailing wheel axle as seen relative to the movement direction:
   monitor a wheel slip of the wheels arranged at the at least one leading wheel axle, and
   controlling a wheel torque of the wheels arranged at the at least one trailing wheel axle based on: (i) the monitored wheel slip, (ii) a speed of the vehicle relative to the surface, and (iii) distance between the at least one leading wheel axle and the at least one trailing wheel axle, and wherein controlling the wheel torque of the wheels arranged at the at least one trailing wheel axle further comprises:
      using a time delay from the monitored wheel slip of the wheels arranged at the at least one leading wheel axle, wherein a duration of the time delay is set based on a ratio between the distance between the at least one leading wheel axle and the at least one trailing wheel axle and the speed of the vehicle relative to the surface.

11. A vehicle comprising two or more wheel axles and a number of wheels arranged at each of the two or more wheel axles, and wherein the vehicle comprises a control arrangement configured to, when the vehicle is moving in a movement direction relative to a surface supporting the vehicle such that at least one of the two or more wheel axles constitutes a leading wheel axle and at least one of the two or more wheel axles constitutes a trailing wheel axle as seen relative to the movement direction:
   monitor a wheel slip of the wheels arranged at the at least one leading wheel axle; and
   controlling a wheel torque of the wheels arranged at the at least one trailing wheel axle based on: (i) the monitored wheel slip, (ii) a speed of the vehicle relative to the surface, and (iii) distance between the at least one leading wheel axle and the at least one trailing wheel axle, and wherein controlling the wheel torque of the wheels arranged at the at least one trailing wheel axle further comprises:
      using a time delay from the monitored wheel slip of the wheels arranged at the at least one leading wheel axle, wherein a duration of the time delay is set based on a ratio between the distance between the at least one leading wheel axle and the at least one trailing wheel axle and the speed of the vehicle relative to the surface.

12. The vehicle according to claim 11, wherein the vehicle comprises two or more powertrains each comprising a power source configured to provide motive power to the vehicle via the wheels arranged at a respective wheel axle of the two or more wheel axles, and wherein the control arrangement is configured to control the wheel torque of the wheels arranged at the at least one trailing wheel axle by controlling operation of the powertrain of the at least one trailing wheel axle.

13. The vehicle according to claim 12, wherein each of the two or more powertrains is separate from, and independent of, the other of the two or more powertrains.

14. The vehicle according to claim 12, wherein the power source of at least one of the two or more powertrains is an electric machine.

15. The vehicle according to claim 11, wherein the vehicle is a heavy road vehicle.

16. A method of controlling operation of a vehicle, wherein the method is performed by a control arrangement, and wherein the vehicle comprises two or more wheel axles and a number of wheels arranged at each of the two or more wheel axles, wherein the method comprises, when the vehicle is moving in a movement direction relative to a surface supporting the vehicle such that at least one of the two or more wheel axles constitutes a leading wheel axle and at least one of the two or more wheel axles constitutes a trailing wheel axle as seen relative to the movement direction:
   monitoring a wheel slip of the wheels arranged at the at least one leading wheel axle;
   detecting a change in the wheel slip of the wheels arranged at the at least one leading wheel axle; and
   controlling a wheel torque of the wheels arranged at the at least one trailing wheel axle based on: (i) the monitored wheel slip, (ii) a speed of the vehicle relative to the surface, and (iii) distance between the at least one leading wheel axle and the at least one trailing wheel axle, and wherein controlling the wheel torque of the wheels arranged at the at least one trailing wheel axle further comprises:
      adjusting the wheel torque of the wheels arranged at the at least one trailing wheel axle based on a magnitude of the detected change in the wheel slip of the wheels arranged at the at least one leading wheel axle; and adjusting the wheel torque of the wheels arranged at one or more other wheel axles of the two or more wheel axles with a combined magnitude set to compensate for the adjustment of the wheel torque of the wheels arranged at the at least one trailing wheel axle.

17. The method according to claim 16, wherein the method comprises:
providing a friction coefficient estimate between the surface and the wheels arranged at the at least one leading wheel axle based on the monitored wheel slip, and
wherein controlling the wheel torque of the wheels arranged at the at least one trailing wheel axle comprises:
adjusting the wheel torque of the wheels arranged at the at least one trailing wheel axle based on the provided friction coefficient estimate.

18. The method according to claim 16, wherein the vehicle comprises a powertrain configured to provide motive power to the vehicle via the wheels arranged at the at least one trailing wheel axle, and wherein controlling the wheel torque of the wheels arranged at the at least one trailing wheel axle comprises:
controlling operation of the powertrain of the at least one trailing wheel axle.

19. The method according to claim 16, wherein the vehicle comprises wheel brakes controllable to brake the wheels arranged at each of the two or more wheel axles of the vehicle, and wherein controlling the wheel torque of the wheels arranged at the at least one trailing wheel axle comprises:
controlling operation of the wheel brakes of the at least one trailing wheel axle.

* * * * *